US008504040B2

(12) United States Patent
Lee et al.

(10) Patent No.: US 8,504,040 B2
(45) Date of Patent: Aug. 6, 2013

(54) WIRELESS/WIRED BACKHAUL-AWARE CELL SELECTION MECHANISM

(75) Inventors: Ki-Dong Lee, San Diego, CA (US); Li-Hsiang Sun, San Diego, CA (US)

(73) Assignee: LG Electronics Inc., Seoul (KR)

( * ) Notice: Subject to any disclaimer, the term of this patent is extended or adjusted under 35 U.S.C. 154(b) by 276 days.

(21) Appl. No.: 13/004,845

(22) Filed: Jan. 11, 2011

(65) Prior Publication Data

US 2011/0230179 A1    Sep. 22, 2011

Related U.S. Application Data

(60) Provisional application No. 61/315,867, filed on Mar. 19, 2010.

(51) Int. Cl.
*H04W 36/00* (2009.01)

(52) U.S. Cl.
USPC ........... 455/436; 455/437; 455/442; 455/443; 455/453; 370/331

(58) Field of Classification Search
USPC ...... 455/422.1, 450–455, 464, 509, 436–444, 455/434, 7–11.1, 15, 16; 370/328–337, 339, 370/341–348, 431–463, 321–334, 328–330, 370/310, 310.2, 312, 315–328, 338–348
See application file for complete search history.

(56) References Cited

U.S. PATENT DOCUMENTS

| 2006/0035662 | A1 | 2/2006 | Jeong et al. | |
|---|---|---|---|---|
| 2008/0020780 | A1 | 1/2008 | Hanov et al. | |
| 2008/0039112 | A1 * | 2/2008 | Park | 455/453 |
| 2008/0075094 | A1 * | 3/2008 | Ahn et al. | 370/400 |
| 2008/0117812 | A1 * | 5/2008 | Shin | 370/230 |
| 2008/0298249 | A1 * | 12/2008 | Baker et al. | 370/238 |
| 2009/0041246 | A1 * | 2/2009 | Kitazoe | 380/270 |
| 2009/0163223 | A1 * | 6/2009 | Casey | 455/453 |
| 2009/0232107 | A1 | 9/2009 | Park et al. | |
| 2010/0142485 | A1 * | 6/2010 | Lee et al. | 370/331 |
| 2010/0165943 | A1 * | 7/2010 | Kato et al. | 370/329 |
| 2010/0216471 | A1 * | 8/2010 | Meyer et al. | 455/436 |
| 2010/0309836 | A1 * | 12/2010 | Sugawara et al. | 370/312 |

FOREIGN PATENT DOCUMENTS

| WO | WO 2008/153095 | * | 12/2008 |
|---|---|---|---|
| WO | WO 2009/022837 | * | 2/2009 |
| WO | WO 2009/096305 | * | 8/2009 |

* cited by examiner

*Primary Examiner* — Patrick Edouard
*Assistant Examiner* — Ronald Eisner
(74) *Attorney, Agent, or Firm* — Lee, Hong, Degerman, Kang & Waimey

(57) ABSTRACT

A method for selecting a cell in a wireless communication system includes performing a cell selection process in a mobile terminal, which includes receiving, in the mobile terminal, information from each of at least one cell, each information including a preference value, where each preference value indicates a congestion level of a corresponding one of the at least one cell, and selecting, in the mobile terminal, one of the at least one cell according to the received preference value. The method for selecting a cell a wireless communication system further includes attempting, by the mobile terminal, to connect with the selected cell by performing a random access procedure with the selected cell.

10 Claims, 5 Drawing Sheets

WIRELESS/WIRED BACKHAUL-AWARE CELL SELECTION MECHANISM

CROSS-REFERENCE TO RELATED APPLICATIONS

Pursuant to 35 U.S.C. §119(e), this application claims the benefit of U.S. Provisional Application No. 61/315,867 filed on Mar. 19, 2010, the content of which is hereby incorporated by reference herein in its entirety.

FIELD OF THE INVENTION

The present invention relates to telecommunications, and in particular, to wireless/wired communication techniques.

DESCRIPTION OF THE RELATED ART

Radio technologies used in wireless networks are continuously evolving to achieve higher data rates and to provide nearly ubiquitous, high speed broadband wireless coverage. The radio technologies capable of meeting these goals are typically based on orthogonal frequency division multiplexing (OFDM) schemes, which have already been adopted by next generation cellular systems, such as the Long Term Evolution (LTE) system and Mobile WiMax system.

An OFDM physical layer enables orthogonal frequency division multiple access (OFDMA) allowing for multiuser diversity by managing both time and frequency components in the radio resource allocation process. In an OFDMA-based cellular network, efficient radio resource allocation techniques are critical for taking full advantage of OFDMA capabilities. Therefore, cell selection techniques enabling the selection of the most appropriate cell to handle radio transmissions to and/or from a user equipment (UE), such as a cellular telephone, plays a key role in the resource allocation process.

Cell selection in a cellular network refers to the process by which a UE attempts to select a cell from among candidate cells capable of providing adequate radio link quality to enable the UE to transmit and receive data packets. Typically, such cell selection methods are performed at the link initiation phase or during handover.

Conventional cell selection methods in cellular networks are primarily based on radio criteria, since the air interface is generally assumed to be the most limiting factor in terms of available resources and, therefore, the most likely cause of congestion in the cellular network. For the most part, such an assumption has proven to be valid for traditional cellular voice networks where, as the aggregate traffic rate supported by each cell site in a cellular network is relatively low, backhaul dimensioning accounting for air interface peak rates remained an economically feasible option.

However, it should be noted that due to the deployment of enhanced air interfaces, the increases in mobile data and multimedia traffic, the introduction of Relay Nodes (RNs) and machine-type communication nodes in the 3GPP LTE-Advanced Release 10 specification, severe congestion may result in the wireless and wired backhaul of cellular networks in various deployment scenarios. Specifically, with respect to the introduction of RNs in cellular networks in the 3GPP LTE-Advanced Release 10 specification, the wireless and/or wired backhaul link that was able to cope with peak cell rate capacities no longer appears to be an efficient option. Since backhaul costs could amount to as much as one quarter of the total network costs, mobile operators may be hesitant to invest in additional transport capacity to support temporary peak data rates in an effort to reduce congestion.

Therefore, the Next Generation Mobile Networks (NGMN) Alliance has recently presented the best practices for efficient wired backhaul design. Moreover, there are an increasing number of solutions pushing for the adoption of more cost-effective transmission technologies along with more efficient resource management functionality to address backhaul congestion problems. Furthermore, the use of RNs demands the best practices for efficient wireless as well as wired backhaul design. Although wired backhaul design has been considered in some proposed network configurations, such proposed network configurations are not primarily focused on wireless backhaul design or any related cell selection techniques.

Such lack of efficient cell selection techniques in cellular systems has initiated significant research efforts. Notwithstanding the multiple access technology being implemented, one known cell selection approach includes minimum path loss (MPL), which assigns each user to the base station that provides the highest radio link gain. Another known cell selection approach considers the signal to interference and noise ratio (SINR) in the assignment process, which is particularly important when targeting an aggressive reuse of the spectral resource throughout the cellular network, such as in single channel code division multiple access (CDMA) networks and OFDMA networks with low reuse factors. However, in such a case, there is a mutual dependency between the SINR values and the cell selection in the downlink, which further complicates resource allocation. In addition to channel gain and SINR, various constraints such as maximum transmission powers or minimum guaranteed rates have also been considered under various types of optimization scenarios.

Cell selection approaches in multi-cell OFDMA based on SINR and constraints on the BS downlink radio capacity, where the mutual dependency issue is avoided by performing a greedy cell selection that sequentially chooses the user with the highest SINR, has shown to be less than optimal. Moreover, cell selection approaches involving an iterative cell selection scheme aimed to balance traffic densities, where the assignment decision is based on the MPL criterion and quality of service (QoS) requirements of users, have also shown to be less than optimal. Such cell selection approaches addressing resource allocation in multi-cell OFDMA have been shown to be less than optimal, due to the fact that such cell selection approaches are implicitly based on a simple MPL criterion and concentrate on the development of algorithmic solutions to subcarrier and power allocation problems.

Therefore, current cell selection methods used in wireless communication networks are generally inadequate for alleviating wireless or wired backhaul congestion. Moreover, the introduction of RNs in the 3GPP LTE-Advanced Release 10 specification is expected to increase congestion in various communication links in cellular networks, such as the Un links between donor eNBs and RNs.

SUMMARY OF THE INVENTION

In one aspect of the present invention, a method for selecting a cell in a wireless communication system is provided. The method includes performing a cell selection process in a mobile terminal by receiving, in the mobile terminal, information from each of at least one cell, each information including a preference value, wherein each preference value indicates a congestion level of a corresponding one of the at least one cell, and selecting, in the mobile terminal, one of the at least one cell according to the received preference value. The method further includes attempting, by the mobile terminal, to connect with the selected cell by performing a random access procedure with the selected cell.

It is contemplated that the mobile terminal attempts to connect with the selected cell via a relay node. It is further contemplated that the selected cell includes a relay node.

It is contemplated that the preference value is set according to a congestion level of each traffic class of a corresponding one of the at least one cell. It is further contemplated that one of the at least one cell is selected according to a traffic class of the mobile terminal.

It is contemplated that the information is a system information block.

It is contemplated that performing the random access procedure with the selected cell includes transmitting a random access request to connect with the selected cell, and receiving a random access response from the selected cell. It is further contemplated that the random access procedure is a contention-based random access procedure.

It is contemplated that performing the random access procedure with the selected cell includes transmitting a random access request to connect with the selected cell, receiving a random access response from the selected cell, performing a scheduled transmission to the selected cell upon receiving the random access response, and receiving, in the mobile terminal, decision information from the selected cell indicating whether the mobile terminal is to connect with the selected cell.

It is contemplated that the scheduled transmission includes at least one of a traffic class, a list of candidate cells and a link quality. It is further contemplated that the decision information indicates rejection of a connection between the mobile terminal and the selected cell.

It is contemplated that the selected cell transmits a cell radio network temporary identifier (C-RNTI) to candidate cells when the decision information indicates rejection of the connection between the mobile terminal and the selected cell.

It is contemplated that the method further includes attempting, by the mobile terminal, to connect with one of the candidate cells by performing a random access procedure with one of the candidate cells.

It is contemplated that the mobile terminal performs a non-contention based random access procedure with one of the candidate cells by using the C-RNTI, where the C-RNTI is included in the received random access response. It is further contemplated that the random access procedure is a contention-based random access procedure.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
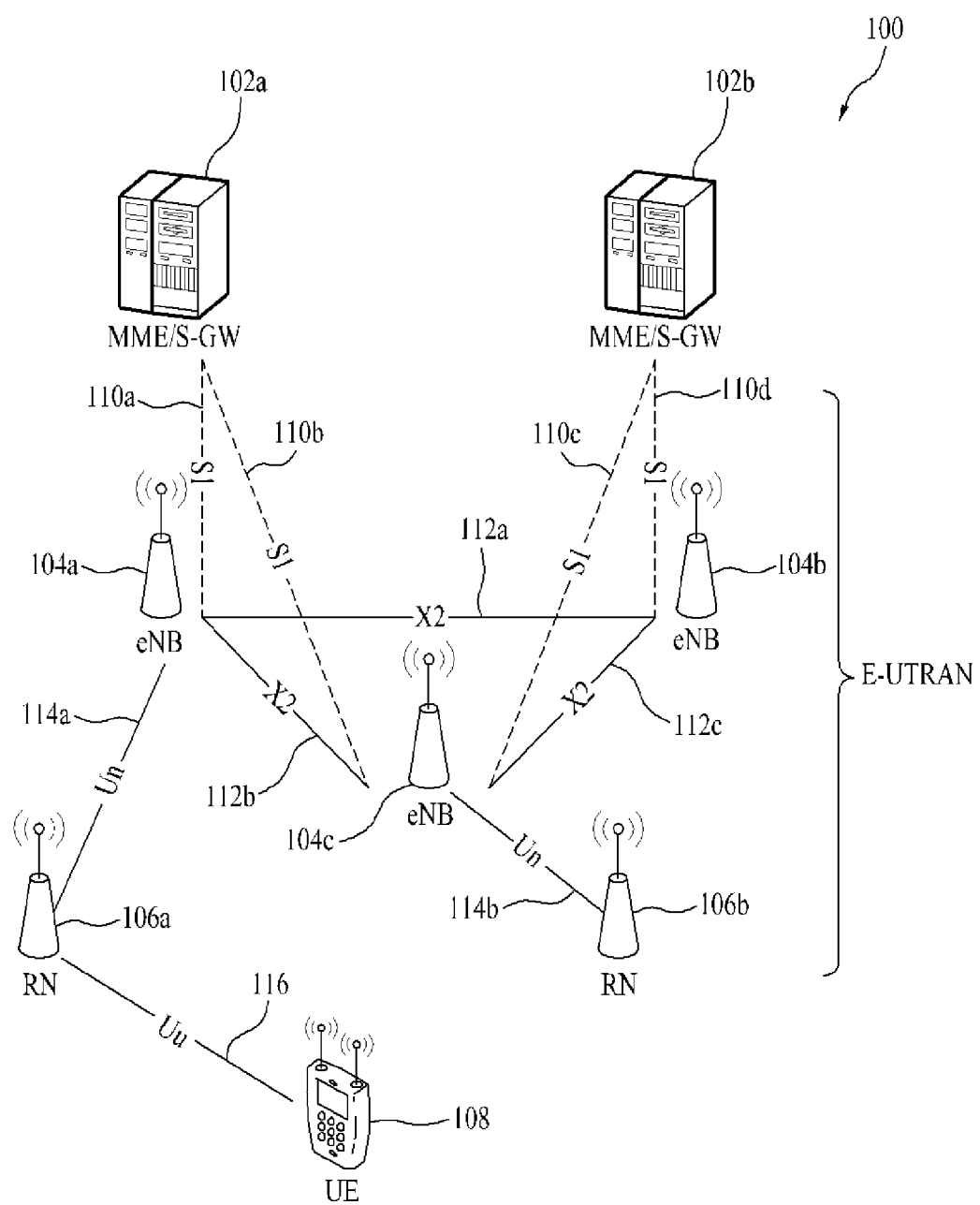
FIG. 1 shows a cellular network in accordance with one embodiment of the invention.

FIG. 1 shows a network 100 in accordance with one embodiment of the invention. For example, the network 100 can be a 3GPP cellular network.

The network 100 includes the mobility management entity serving gateways (MME/S-GWs) 102a and 102b, the evolved NodeBs (eNBs) 104a, 104b and 104c, the relay nodes (RNs) 106a and 106b, and the UE 108 (also herein referred to as a "mobile terminal").

As shown in FIG. 1, the MME/S-GW 102a is in communication with the eNB 104a via the S1 interface 110a and in communication with the eNB 104c via the S1 interface 110b. The MME/S-GW 102b is in communication with the eNB 104b via the S1 interface 110d and in communication with the eNB 104c via the S1 interface 110c. As also shown in FIG. 1, the eNB 104a is in communication with the eNB 104b via the X2 interface 112a and in communication with the eNB 104c via the X2 interface 112b. As further shown in FIG. 1, the eNB 104b is in communication with the eNB 104c via the X2 interface 112c.

As shown in FIG. 1, the eNB 104a is also in communication with relay node (RN) 106a via the Un interface 114a. In the embodiment of FIG. 1, the eNB 104a can alternatively be referred to as a donor eNB (DeNB). As also shown in FIG. 1, the eNB 104c is also in communication with the RN 106b via the Un interface 114b. As further shown in FIG. 1, the RN 106a is in communication with the UE 108 via the Uu interface 116. The UE 108 can be, for example, a mobile communication device, such as a cellular telephone. For example, the UE 108 can communicate with the MME/S-GWs 102a and 102b using a Non-Access Stratum (NAS) protocol. In the embodiment of FIG. 1, the eNBs 104a, 104b and 104c, and the RNs 106a and 106b form the Evolved Universal Terrestrial Radio Access (E-UTRA) of the network 100.

Figure 2:
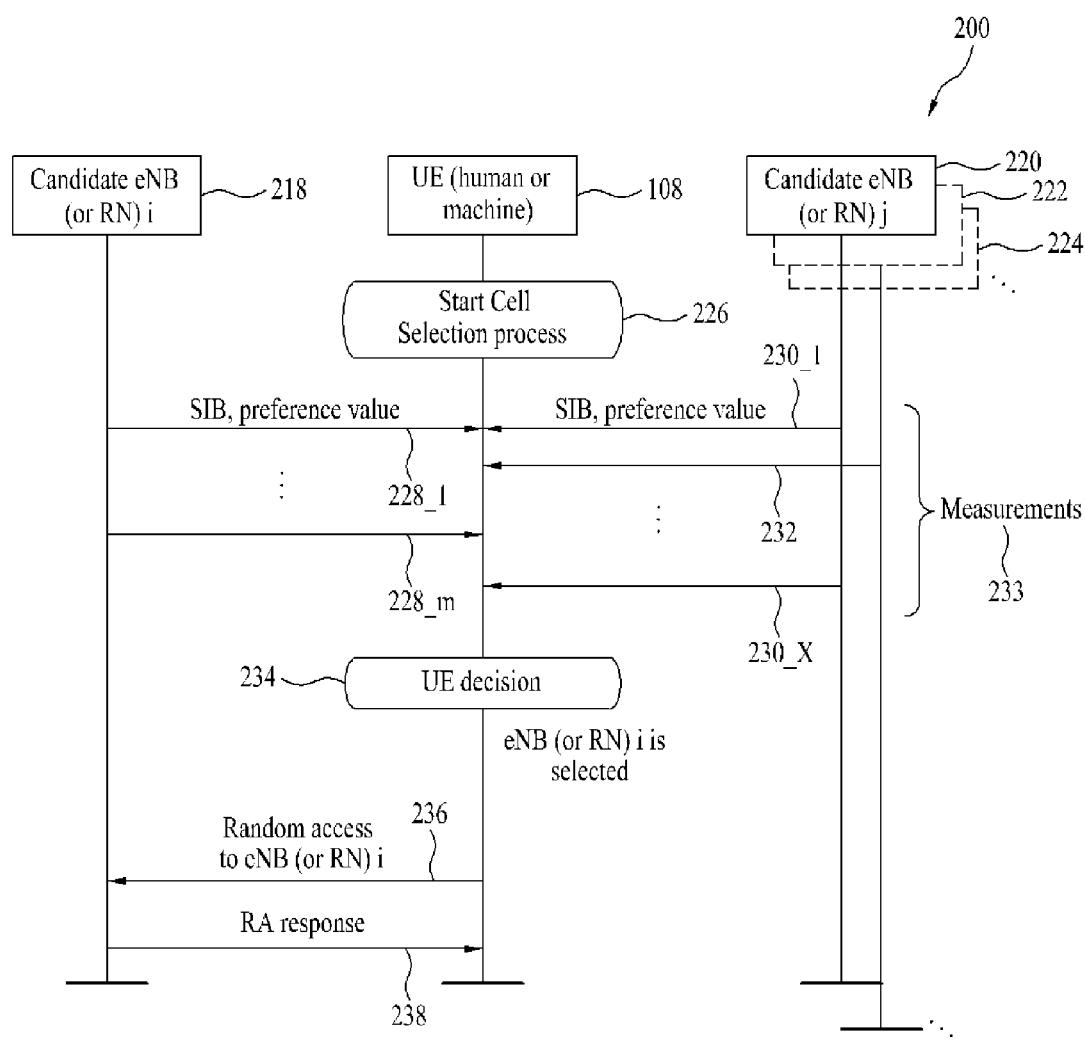
FIG. 2 shows a cell selection method in accordance with one embodiment of the invention

FIG. 2 shows a cell selection method 200 in accordance with one embodiment of the invention. In the embodiment of FIG. 2, the UE 108 performs the cell selection method 200 according to a distributed decision method.

As shown in FIG. 2, the UE 108 begins the cell selection process 200 at step 226 and performs measurements 233 by receiving one or more transmissions including system information blocks (SIBs) and preference values associated with each candidate eNB or RN in the network 100. For example, with reference to FIG. 2, the UE 108 can receive the transmissions 228_1 through 228_m from the candidate eNB 218, the transmissions 230_1 through 230_x from the candidate eNB 220 and transmissions from the candidate eNB 222, such as the transmission 232, where "m" and "x" can each be an integer value. In the embodiment of FIG. 2, each of the transmissions 228_1 through 228_m, 230_1 through 230_x, and 232 includes an SIB and a preference value. It should be understood that one or more of the candidate eNBs 218, 220, 222 and/or 224 can alternatively be an RN.

As shown in FIG. 2, the UE 108 can perform measurements 233 for a specific period of time or until an "N" number of information blocks containing a preference value are received by the UE 108. For example, the specific period of time and/or the integer value of "N" can be configured by the network 100 or by the UE 108. The specific period of time and/or the integer value of "N" can be provided to the UE 108 for random access (also herein referred to as "RA") via an SIB, such as "SIB1," when the specific period of time and/or the integer value of "N" is configured by the network 100. For example, the period during which the UE 108 is notified via the SIB can be configured by the network 100 or a node in the network, such as the candidate eNB 218.

The preference value can be a value representing the degree to which a candidate eNB is willing to accommodate the UE 108. In one embodiment, the preference value transmitted from a candidate eNB can be an integer or a binary value indicating a level of congestion of one or more cells in the network 100 in which the candidate eNB is located. For example, the preference value can be a 2-bit binary value, such that "00" indicates approximately 25% congestion, "01" indicates approximately 50% congestion, "10" indicates approximately 75% congestion and "11" indicates approximately 100% congestion.

For example, the preference value can be set by the one or more cells in a negotiated manner, such that the preference value is a single value representing the same degree of preference among different cells. As another example, the preference value can be set in a distributed manner, such that a utility of the user of the UE 108 is used in the determination of the preference value. As a further example, the preference value can be set in consideration of multiple traffic classes within intra radio access technology (RAT) settings or among inter-RAT settings, and further in consideration of multiple levels within each of such multiple traffic classes. In one embodiment, the preference value can be set to the highest possible value for emergency calls regardless of the RAT applied by the network 100 and notwithstanding the types of traffic or communication being used.

In one embodiment, after receiving one or more SIBs and preference values from the candidate eNBs, such as the candidate eNBs 218, 220, 222 and/or 224, the UE 108 can transmit tailored information to the corresponding candidate eNBs so that the tailored information can be considered in the calculation of the preference value. For example, the tailored information can be an estimated or measured link quality based on the information in the received SIBs.

As further shown in FIG. 2, the UE 108 makes a decision 234 by selecting an eNB from among the candidate eNBs according to the received preference values. The UE 108 then attempts to connect to the selected eNB, such as the candidate eNB 218, by performing a random access procedure with the selected eNB. For example, as shown in FIG. 2, the UE 108 can perform the random access procedure to connect with the selected eNB by transmitting a random access request 236 to the selected eNB and by receiving a random access response 238 from the selected eNB.

Figure 3:
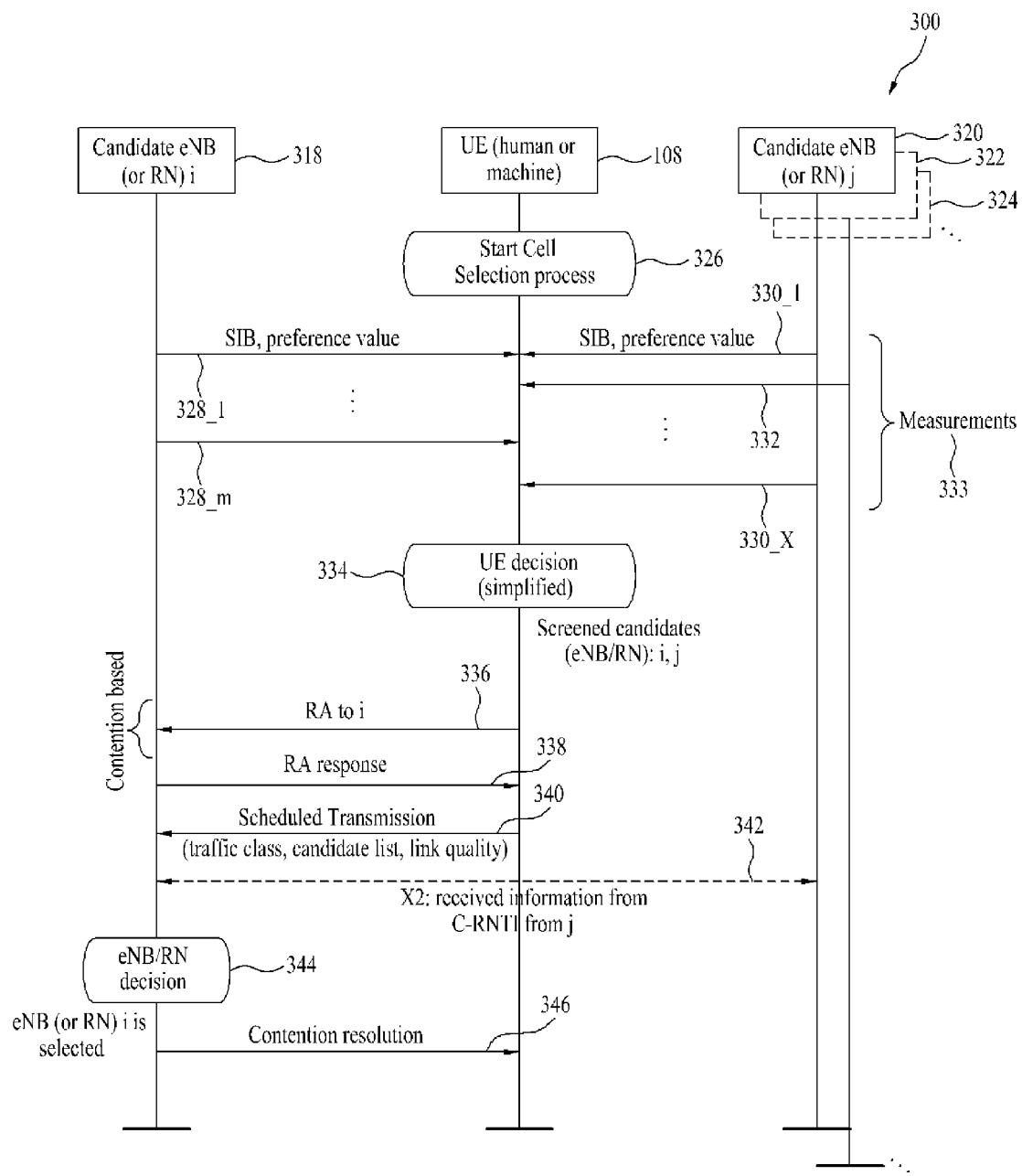
FIG. 3 shows a cell selection method in accordance with one embodiment of the invention.

FIG. 3 shows a cell selection method 300 in accordance with one embodiment of the invention. In the embodiment of FIG. 3, the UE 108 and a candidate eNB perform the cell selection process 300 according to a centralized decision and recommendation notification method.

As shown in FIG. 3, the UE 108 begins the cell selection process 300 at step 326 and performs measurements 333 by receiving one or more transmissions including SIBs and preference values associated with each candidate eNB in the cellular network 100. For example, with reference to FIG. 3, the UE 108 can receive the transmissions 328_1 through 328_m from the candidate eNB 318, the transmissions 330_1 through 330_x from the candidate eNB 320 and the transmission 332 from the candidate eNB 322, where "m" and "x" can each be an integer value. In the embodiment of FIG. 3, each of the transmissions 328_1 through 328_m, 330_1 through 330_x, and 332 includes an SIB and a preference value. It should be understood that one or more of the candidate eNBs 318, 320, 322 and/or 324 can alternatively be an RN.

As shown in FIG. 3, the UE 108 can perform measurements 333 for a specific period of time or until an "N" number of information blocks containing a preference value are received by the UE 108. For example, the specific period of time and/or the integer value of "N" can be configured by the network 100 or by the UE 108. The specific period of time and/or the integer value of "N" can be provided to the UE 108 for random access (also herein referred to as "RA") via an SIB, such as "SIB1," when the specific period of time and/or the integer value of "N" is configured by the network 100. For example, the period during which the UE 108 is notified via the SIB can be configured by the network 100 or a node in the network, such as the candidate eNB 318.

In one embodiment, after receiving one or more SIBs from the candidate eNBs, such as the candidate eNBs 318, 320, 322 and/or 324, the UE 108 can transmit tailored information to the corresponding candidate eNBs so that the tailored information can be considered in the calculation of the preference value. For example, the tailored information can be an estimated or measured link quality based on the information in the received SIBs.

The UE 108 then makes a decision 334 by selecting the most optimum, that is, the local-optimum eNB, of the candidate eNBs according to the received preference values. The UE 108 then attempts to connect to each of the candidate eNBs by performing a random access procedure with each of the candidate eNBs. For example, the UE 108 can perform a random access procedure with the local-optimum eNB, the second most optimum eNB, the third most optimum eNB, and so on. In performing the random access procedure with candidate eNBs that are less optimum than the local-optimum eNB, such as the second and third most optimum candidate eNBs, the UE 108 provides an identification of the local-optimum eNB. The identification of the local-optimum eNB triggers each of the less optimum candidate eNBs to send information received from the UE 108 to the local-optimum eNB via an X2 interface, for example.

As shown in FIG. 3, for example, the UE 108 can perform the random access procedure by transmitting a random access request 336 to connect with the local-optimum eNB, such as candidate eNB 318, and by receiving a random access response 338 from the local-optimum eNB. The UE 108 can then transmit the scheduled transmission 340 that can include, for example, the traffic class desired by the UE 108, the candidate list for the UE 108, and the link quality measured by the UE 108. Thereafter, the local-optimum eNB can receive a cell radio network temporary identifier (C-RNTI) 342 from the remaining candidate eNBs, such as the candidate eNB 320, via an X2 interface.

As further shown in FIG. 3, the local-optimum eNB, such as candidate eNB 318, can make a decision 344 as to the candidate eNB with which the UE 108 is to establish a connection. If the local-optimum eNB remains the most optimum of the candidate eNBs, then the local-optimum eNB sends a random access response to the UE 108. Thereafter, the local-optimum eNB sends a contention resolution message 346 to the UE 108.

Figure 4:
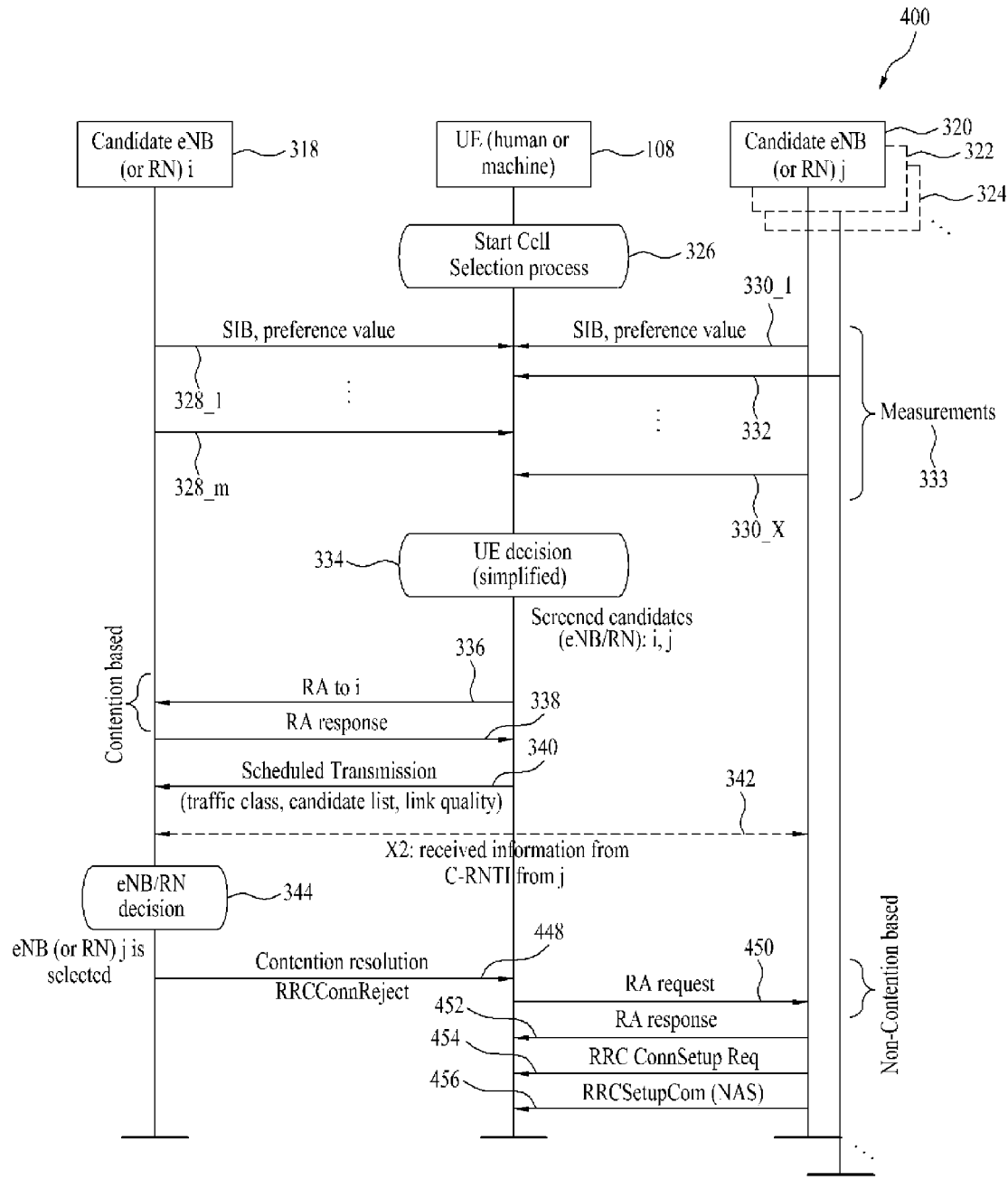
FIG. 4 shows a cell selection method in accordance with one embodiment of the invention.

FIG. 4 shows a cell selection method 400 in accordance with one embodiment of the invention.

In the embodiment of FIG. 4, the UE 108 and a candidate eNB perform the cell selection process 400 according to a centralized decision and recommendation notification method as described with respect to the cell selection process 300 described above with reference to FIG. 3. However, when making the decision 344 in the cell selection process 400, if the local-optimum eNB determines that a different candidate eNB, such as the candidate eNB 320, is a more optimum candidate eNB, that is, a global-optimum eNB, then the local-optimum eNB sends a recommendation to the UE 108 that the UE 108 should connect to the global-optimum eNB and further sends random access process information to the global-optimum eNB. The random access process information is used by the global-optimum eNB for taking over the random access process on behalf of the local-optimum eNB. The UE 108 then follows the recommendation.

For example, as shown in FIG. 4, the local-optimum eNB, such as the candidate eNB 318, sends an RRC Connection Reject message 448 to the UE 108 with an identification of the global-optimum eNB, such as candidate eNB 320. Upon receiving the RRC Connection Reject message 448, the UE 108 may interpret the RRC Connection Reject message 448 to mean that the local-optimum eNB is congested or that the global-optimum eNB is actually the most optimum of the candidate eNBs. The RRC Connection Reject message 448 can include a C-RNTI assigned by the global-optimum eNB. The UE 108 can then use the received C-RNTI to perform a non-contention based random-access process with the global-optimum eNB.

For example, as shown in FIG. 4, the UE 108 can perform a non-contention based random-access process with the candidate eNB 320 by transmitting the random access request 450 to the candidate eNB 320 and by receiving a random-access response 452 from the candidate eNB 320. Thereafter, the UE 108 can receive an RRC Connection Setup Request message 454 from the candidate eNB 320 and can transmit an RRC Setup Complete message 456 to the candidate eNB 320 to establish a connection.

The cell selection methods described herein, that is, the distributed decision method and the centralized decision and recommendation notification method, can be efficiently implemented without imposing any significant computational burdens on the network 100.

In the distributed decision method, the UE 108 can be configured to compute the following expression:

$$(DD) \max \left\{ \sum_j u_j x_j \right\} \quad \text{(expression 1)}$$

$$\text{s.t.} \sum_j x_j \le 1$$

$$x_j \in \{0, 1\}$$

where the variable "j" represents one of the candidate eNBs or RNs in the network 100, such as the candidate eNB or RN 320, $u_j$ is the utility factor that is measured by the UE 108 or received from a candidate eNB or RN, and $x_j$ is the control variable. For example, $x_j=1$ when the "j" candidate eNB or RN is selected by the UE 108 and $x_j=0$ when the "j" candidate eNB or RN is not selected by the UE 108. Although the upper and lower bounds of summation have not been specified in expression 1, the upper and lower bounds can be determined according to the number of the candidate eNBs or RNs in the network 100.

Expression 1 has a simple solution that can be expressed as:

$$x_j = \begin{cases} 1, & j = \mathrm{argmax}\{u_j\} \\ 0, & \text{otherwise} \end{cases}$$

In the centralized decision and recommendation notification method, the candidate eNBs or RNs can be configured to compute the following expression:

$$\max \left\{ \sum_i \sum_j u_{ij} x_{ij} \right\} \quad \text{(expression 2)}$$

$$\text{s.t.} \sum_j x_{ij} \le 1, \forall i$$

$$x_{ij} \in \{0, 1\}$$

where the variable "j" represents one of the candidate eNBs or RNs in the network 100, such as the candidate eNB or RN 320, the variable "i" represents one of the UEs in the network 100, such as the UE 108, $u_{ij}$ is the utility factor as measured by a candidate eNB or RN, and $x_{ij}$ is the control variable. For example, $x_{ij}=1$ when the "i" UE selects the "j" candidate eNB or RN and $x_{ij}=0$ when the "i" UE does not select the "j" candidate eNB or RN. Although the upper and lower bounds of summation have not been specified in expression 2, the upper and lower bounds with respect to index "i" can be determined according to the number of UEs in the network 100, and the upper and lower bounds with respect to index "j" can be determined according to the number of candidate eNBs or RNs in the network 100. Expression 2 can be computed in a polynomial time algorithm. Furthermore, expression 2 requires less computation than a bipartite matching problem and can also be computed using the Hungarian method which provides a computational complexity of $O(N^3)$, where N is the number of matching entities.

Therefore, the centralized decision and recommendation notification method and the distributed decision method each involve low computational complexity and are, therefore, technically feasible.

Figure 5:
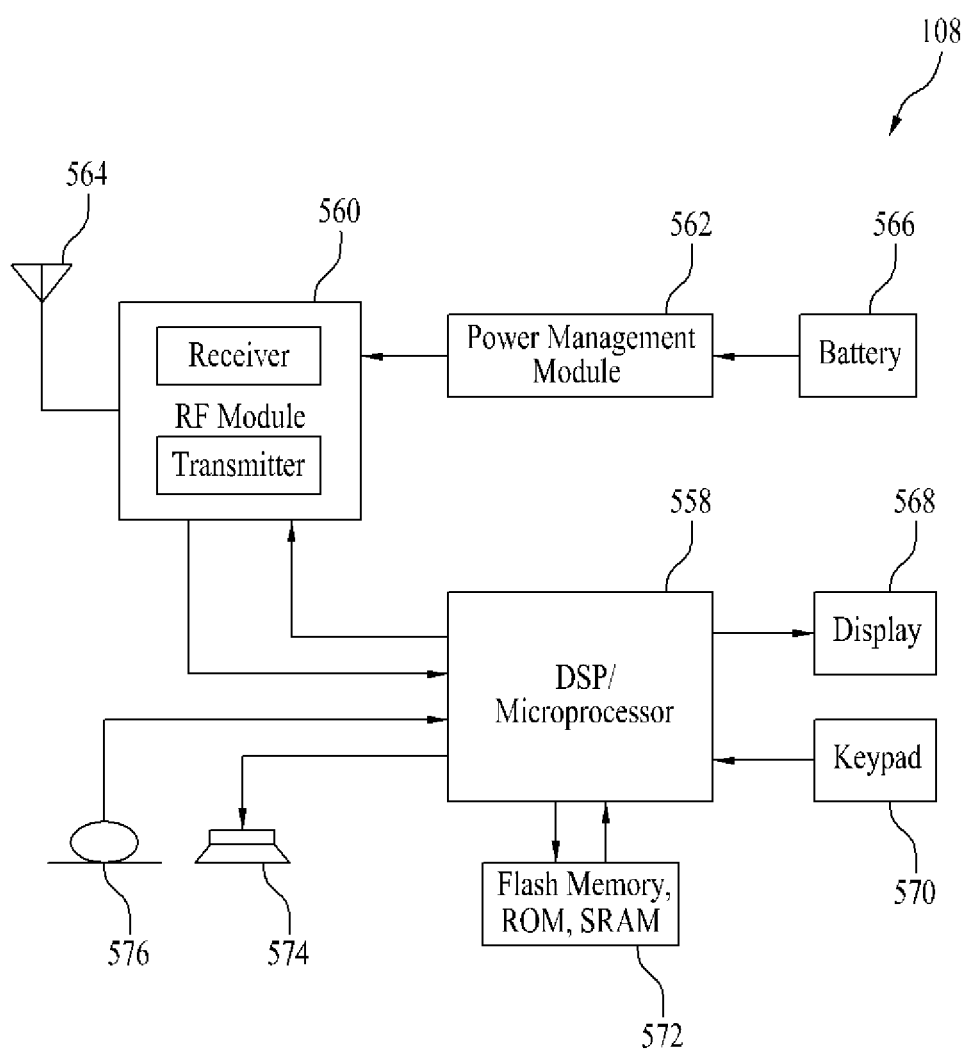
FIG. 5 shows a block diagram of a user equipment (UE) in accordance with one embodiment of the invention.

FIG. 5 shows a block diagram of the UE 108 in accordance with one embodiment of the invention. The UE 108 includes a microprocessor (or digital signal processor) 558, RF module 560, power management module 562, antenna 564, battery 566, display 568, keypad 570, memory 572, speaker 574 and microphone 576.

A user enters instructional information, such as a telephone number, for example, by pushing the buttons of a keypad 570 or by voice activation using the microphone 576. The microprocessor 558 receives and processes the instructional information to perform the appropriate function, such as to dial the telephone number. Operational data may be retrieved from the memory module 572 to perform the function. Furthermore, the microprocessor 558 may display the instructional and operational information on the display 568 for the user's reference and convenience.

The microprocessor 558 issues instructional information to the RF module 560, to initiate communication, for example, transmits radio signals comprising voice communication data. The RF module 560 comprises a receiver and a transmitter to receive and transmit radio signals. An antenna 564 facilitates the transmission and reception of radio signals. Upon receiving radio signals, the RF module 560 may forward and convert the signals to baseband frequency for processing by the microprocessor 558. The processed signals would be transformed into audible or readable information outputted via the speaker 574, for example. The microprocessor 558 also includes the protocols and functions necessary to perform the various processes described herein.

It will be apparent to one skilled in the art that the UE 108 may be readily implemented using, for example, the microprocessor 558 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage media (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a microprocessor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for selecting a cell in a wireless communication system, the method comprising:
    performing a cell selection process in a mobile terminal comprising:
        receiving, in the mobile terminal, information from each of at least one cell, each information comprising a preference value, wherein each preference value indicates a congestion level of a corresponding one of the at least one cell, and
        selecting, in the mobile terminal, one of the at least one cell according to the received preference value; and
    attempting, by the mobile terminal, to connect with the selected cell by performing a random access procedure with the selected cell,
    wherein performing the random access procedure with the selected cell comprises:
        transmitting a random access request to connect with the selected cell;
        receiving a random access response from the selected cell;
        performing a scheduled transmission to the selected cell upon receiving the random access response; and
        receiving, in the mobile terminal, decision information from the selected cell indicating whether the mobile terminal is to connect with the selected cell,
    wherein the decision information indicates rejection of a connection between the mobile terminal and the selected cell, and
    wherein the selected cell transmits a cell radio network temporary identifier (C-RNTI) to candidate cells when the decision information indicates rejection of the connection between the mobile terminal and the selected cell.

2. The method of claim 1, wherein the mobile terminal attempts to connect with the selected cell via a relay node.

3. The method of claim 1, wherein the selected cell includes a relay node.

4. The method of claim 1, wherein the preference value is set according to a congestion level of each traffic class of a corresponding one of the at least one cell.

5. The method of claim 4, wherein one of the at least one cell is selected according to a traffic class of the mobile terminal.

6. The method of claim 1, wherein the information is a system information block.

7. The method of claim 1, wherein the scheduled transmission comprises at least one of:
    a traffic class;
    a list of candidate cells; and
    a link quality.

8. The method of claim 1, further comprising attempting, by the mobile terminal, to connect with one of the candidate cells by performing a random access procedure with one of the candidate cells.

9. The method of claim 1, wherein the mobile terminal performs a non-contention based random access procedure with one of the candidate cells by using the C-RNTI, wherein the C-RNTI is included in the received random access response.

10. The method of claim 1, wherein the random access procedure is a contention-based random access procedure.

* * * * *